March 18, 1958 R. J. WOHLERS 2,827,576

TWO PHASE SOURCE

Filed Feb. 17, 1956 4 Sheets-Sheet 1

INVENTOR.
ROBERT J. WOHLERS

BY George Sipkin
Lee J. Huntzinger
ATTORNEYS

INVENTOR.
ROBERT J. WOHLERS
BY George Sipkin
Lee I. Huntzberger
ATTORNEYS

March 18, 1958 R. J. WOHLERS 2,827,576

TWO PHASE SOURCE

Filed Feb. 17, 1956 4 Sheets-Sheet 3

INVENTOR.
ROBERT J. WOHLERS
BY George Sipkin
Lee I. Huntzberger
ATTORNEYS

March 18, 1958 R. J. WOHLERS 2,827,576

TWO PHASE SOURCE

Filed Feb. 17, 1956 4 Sheets-Sheet 4

INVENTOR.
ROBERT J. WOHLERS
BY George Lipkin
Lee I. Huntzberger
ATTORNEYS 2,827,576

TWO PHASE SOURCE

Robert J. Wohlers, Orchard Park, N. Y., assignor, by mesne assignments, to the United States of America as represented by the Secretary of the Navy Application February 17, 1956, Serial No. 566,312

10 Claims. (Cl. 307—149)

This invention relates to devices for providing alternating current voltages having a phase angle difference and more particularly, it relates to a system for providing two alternating current voltages of substantially equal amplitude and whose phase angle difference is substantially 90°.

In many situations, such as in the accurate measurement of phase angle, in the solution of trigonometric problems in electronic analog computers, etc., it is often necessary to provide two reference voltages of extremely small harmonic contents that are equal in magnitude and which are in quadrature with one another.

It is, accordingly, the primary object of the present invention to provide a system for providing two alternating current voltages of substantially equal amplitude and whose phase difference is substantially 90°, the amplitude and phase being substantially independent of frequently drifts.

In accordance with the present invention, a system is provided for producing a plurality of voltages of substantially equal amplitude and in quadrature with one another. A signal from a master oscillator is passed through a first channel comprising first signal amplifying means, means for linearly rectifying the output of the signal amplifying means, a differential amplifier having as one input a source of reference voltage and as its other input the output from the linear rectifier, the output of the differential amplifier being applied as the second input to the first amplifying means to control the gain thereof. The same signal from the master oscillator is passed through a second channel substantially similar to the first channel but also including a phase shifting network interposed between the master oscillator and a second signal amplifying means. As in the first channel, the signal is passed through successive stages such as a differential amplifier which has as its other input the reference voltage and output of the differential amplifier controls the gain of the signal amplifier. To control the phase angle between the signals passing through the first and second channels, one leg of the output of the signal amplifying means in the first channel is compared with the plus and minus legs of the output of the amplifier in the second channel in a phase shift detection apparatus. The output of the latter is applied as a second input to the phase shifting network to control the gain thereof.

Other objects and many of the attendant advantages of this invention will be readily appreciated as the same becomes better understood by reference to the following detailed description when considered in connection with the accompanying drawings wherein.

Figure 1:
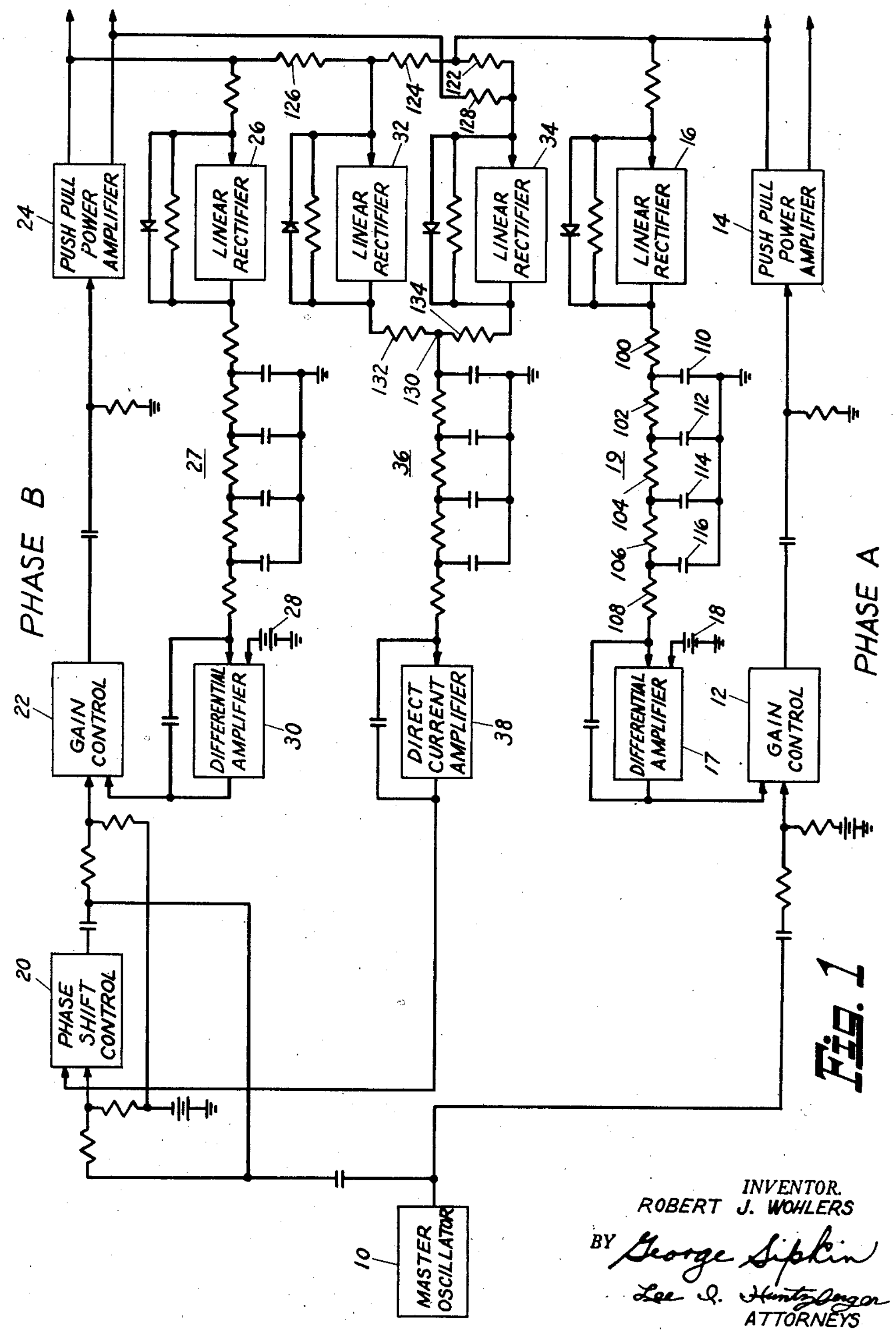
Fig. 1 is a block diagram of a preferred embodiment of the invention.

Referring now to Fig. 1, a master oscillator 10 provides an alternating current voltage signal that is free from harmonics, with no stringent requirements as to frequency or amplitude. This signal is fed into both channels, phase A and phase B. The signal fed into phase A is amplified by a variable gain control stage 12 and a power amplifier 14. In the amplitude control feed back loop, the output of the power amplifier is rectified by a linear rectifier 16. The output of rectifier 16 is applied to a differential amplifier 17 through a low pass RC filter 19 where it is compared with a reference voltage 18. The output of differential amplifier 17 is applied as a second input to variable gain control stage 12. The difference or error output of differential amplifier 17 controls the gain of variable gain control stage 12. Phase A output is thus brought into agreement with the reference voltage 18.

The phase B signal is fed into a controllable phase shift network 20 which shifts the phase 90° of the phase B signal with respect to the phase A signal. The phase shifted signal is then amplified by a variable gain control stage 22 and a power amplifier 24. In the amplitude control feedback loop for the phase B signal, the output of power amplifier 24 is rectified by a linear rectifier 26. The output of linear rectifier 26 is applied to a differential amplifier 30 through a low pass RC filter 27, where it is compared with the reference voltage 28 in a differential amplifier 30, the output of the differential amplifier 30 being applied as a second input to variable gain control stage 22. The difference or error output of differential amplifier 30 controls the gain of variable gain control stage 22. Thus, phase B output, similar to the phase A output, is also brought into agreement with the reference voltage.

The angle between phases A and B is compared in a quadrature detector and any deviation from 90° results in an error signal. This signal, when applied to the phase shift control network 20, brings the phase B signal back into quadrature with the phase A signal. In the quadrature detector, one leg of the phase A signal output from power amplifier 14 is added to the plus and minus legs of the output of the phase B signal from power amplifier 24. The addition of the leg of the phase A signal and one leg of the phase B signal is rectified in a linear rectifier 32 and the addition of the leg of the phase A and the other leg of the phase B signal is rectified in a linear rectifier 34. The magnitudes of the resultant vectors are compared and the comparison is applied as a second input to the phase shift control stage 20 through a low pass RC filter 36, and a direct current amplifier 38. If any deviation from the 90° phase shift occurs, it is thus brought into control.

Figure 2:
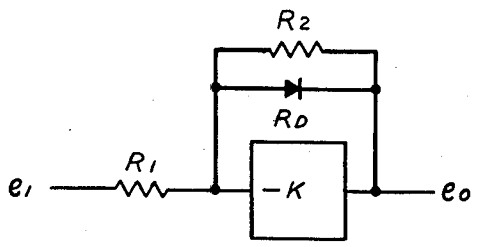
Fig. 2 illustrates the linear rectifying means utilized.

In Fig. 2, there is shown the equivalent circuit of rectifiers 16, 26, 32 and 34. The prime function of these rectifiers is to provide a direct current voltage proportional to an alternating current input voltage. The major consideration is that they be voltage rectifiers, i. e., output voltage should be independent of output loading to eliminate shifts due to component drift. In the circuit of Fig. 2 an input voltage $e_1$ is applied to a direct current amplifier having a gain K through a resistor $R_1$. A parallel combination of a diode $R_D$ which may be a crystal diode such as a 1N56A and a feedback resistor $R_2$ is connected across the amplifier.

In examining the circuit shown in Fig. 2, it is seen that the output voltage $e_0$ is $$e_0=\frac{Ke_1R_f}{R_1+R_f+KR_1}$$

$R_f$ being the resistance of the diode and resistor in parallel $$=\frac{R_DR_2}{R_D+R_2}$$

Since there are two states of operation, corresponding to diode conduct or non-conduct, diode resistance is a function of voltage polarity. Thus, a Fourier series can be written for each state, and the resultant direct current voltage component found for each. The direct current voltage output is the net difference since they are of opposite polarity. Thus $$Y=\frac{e_0}{e_1}=K_1K_0K_2\left[\frac{R_{D1}}{(R_{D1}+R_2)\left(\frac{R_{D1}R_2}{R_{D1}+R_2}+(1+K)R_1\right)}-\frac{R_{D2}}{(R_{D2}+R_2)\left(\frac{R_{D2}R_2}{R_{D2}+R_2}+(1+K)R_1\right)}\right]$$

The function $$\frac{dY}{Y}$$

which is a measure of linearity is $$\frac{dY}{Y}=\frac{1}{R_{D1}-R_{D2}}\left[\frac{\left(R_{D2}+\frac{R_1R_2(1+K)}{R_2+(1+K)R_1}\right)}{\left(1+\frac{R_1R_2(1+K)}{R_{D1}(R_2+(1+K)R_1)}\right)}\frac{dR_{D1}}{R_{D1}}-\frac{\left(R_{D1}+\frac{R_1R_2(1+K)}{R_2+(1+K)R_1}\right)}{\left(1+\frac{R_1R_2(1+K)}{R_{D2}(R_2+(1+K)R_1)}\right)}\frac{dR_{D2}}{R_{D2}}\right]$$

Using suitable design values such as 30K ohms for $R_1$ and $R_2$, 300 ohms (approximate) for $R_{D2}$ and 1 megohm (approximate) for $R_{D1}$ and with K having a value of 500

$$\frac{dY}{X}=\frac{.0303}{1.03}\frac{dR_{D1}}{R_{D1}}-.0103\frac{dR_{D2}}{Rd_2}$$

It is obvious from the foregoing that the output voltage, within reasonable limits, is independent of loading. It is also to be seen from the expression for $$\frac{dY}{Y}$$

that linearization results.

Figure 3:
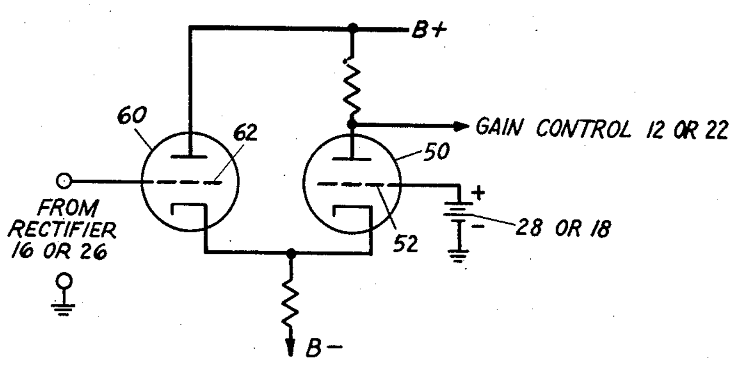
Fig. 3 is a schematic depiction of the differential amplifier.

Fig. 3 illustrates stages 17 and 30 for detecting amplitude error. The amplifier is a differential direct current voltage amplifier with the bias of the grid 52 of a vacuum tube 50 being fixed by a battery that supplies a reference voltage, designated by 28 or 18. The grid 62 of the other vacuum tube 60 is coupled to the output of a respective linear rectifier 16 or 26. The balanced input stage is utilized in order that any drift of heater voltage will tend to be cancelled.

Figure 4:
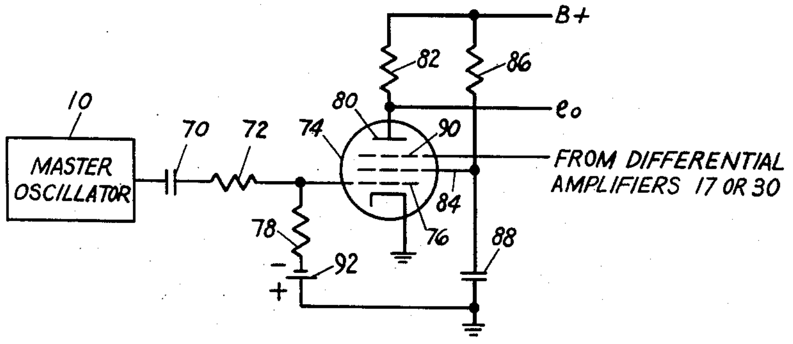
Fig. 4 shows a suitable type of gain control stage.

Fig. 4 illustrates a suitable gain control stage as employed in stages 12 and 22. The signal from the master oscillator 10 is applied through a capacitor 70 and the resistor 72 to the control grid of suppressor controlled pentode vacuum tube 74. Grid 76 is returned to a source of negative potential through a resistor 78. Plate 80 is connected to a B+ source through a resistor 82 and screen grid 84 is also connected to the B+ source through a resistor 86, screen grid 84 also being grounded through a capacitor 88. The input applied to the suppressor grid 90 is from the preceding differential amplifier, 17 or 30 is the voltage difference between the amplified signal and the reference voltage.

As an indication of suitable values for the gain control stages 12 and 22, capacitor 70 may have a value of .05 μf., resistor 72 1M ohms, resistors 78, 0.1M ohms, D. C. potential source 92, —1.5 volts, plate resistor 82, 22K ohms, screen grid resistor 86, 68K ohms, and screen grid capacitor 88, 10 μf. Tube may suitably be a 6AS6 type and the B+ potential source, 200 volts. When the circuit of gain control stages 12 and 22 is operated with very little voltages, say below .25 volt, output distortion can be kept to less than 1%. However, since it is desirable to reduce signal-to-noise ratio associated with low level signals, normal operating procedures suitably require higher voltages. Thus, the attenuator of 10 to 1 is provided to keep the inputs in the order of 1 volt or greater.

Figure 5:
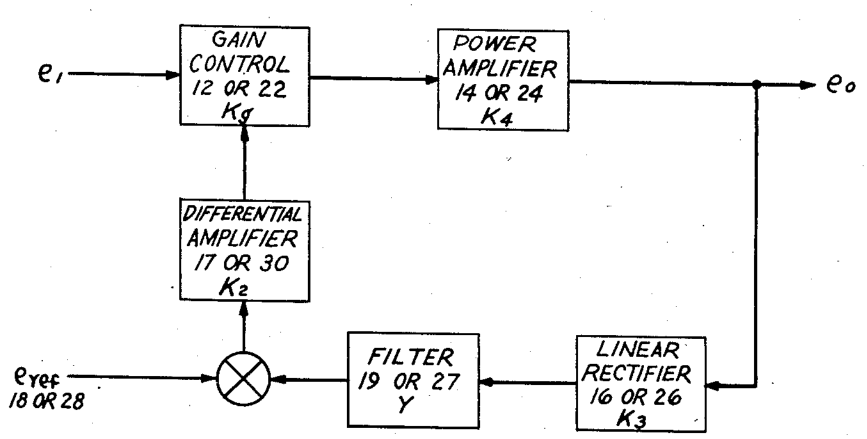
Fig. 5 is a block diagram of the amplitude control servo loop.

Fig. 5 schematically illustrates the closed loop arrangement with respect to amplitude regulation. The important considerations are long time drift, harmonic content and the degrees of stability.

It is seen from Fig. 5 that closed loop response is given by the expression $$e_0=\frac{e_1K_gK_2K_4e_{ref}}{1+e_1K_gK_2K_4Y}$$

For accuracy determination, the frequency response term Y can be neglected, so that $$e_0=\frac{e_1K_gK_2K_4e_{ref}}{1+e_1K_gK_2K_3K_4}$$

Percentage deviation from design center values with a change of $e_1$ is given by $$\frac{\Delta e_0}{e_0}(\%)=\frac{e_1-e_1'}{e_1(1+e_1'K_gK_2K_3K_4)}\times 100$$

With the above system where $e_1$=design center input =1.5 volts, $e_1^1$=drifted input=1 to 2 volts, $K_g$=.5, $K_2$=500, $$K_3=\frac{1}{2.22}$$

(half wave rectification constant), $K_4$=7 and $e_{ref}$=4.5 volts. For $e_1^1=1$, $$\frac{\Delta e_0}{e_0}(\%)=+.042\%$$

and for $e_1^1=2$, $$\frac{\Delta e_0}{e_0}(\%)=-.0211\%$$

Since the most important source of error or drift is generally in the direct current amplifier, using the design parameters as outlined above, the measured drift referred to the input grid (with uncoordinated B supplies) is in the order of about 3 mv. The percent error of the $e_0$ is then $$\frac{3\times 10^{-3}\times 100}{4.5}=.066\%$$

The principal sources of harmonic generation are normal pentode distortion of the gain control stages 12 and 22 and distortion due to alternating current voltage appearing on the gain control grid of these stages. The pentode distortion may be substantially reduced by the choice of operating conditions as previously set forth. The characteristics of low pass RC filters 19 and 27 are accordingly determined by the distortion due to the alternating current voltage appearing on the suppressor grid in stages 12 and 22.

The alternating current modulation voltages can be broken into two sources, those due to the output of linear rectifiers 16 or 26 and those due to the amplified B ripple out of the differential amplifiers 17 and 30. The values of the resistors and capacities in RC filters 19 and 27 are so chosen that subtsantially the major portion of any harmonic generation is removed. Typical values to accomplish such a result with the present system is for resistors 100, 102, 104, 106 and 108 to have values of 47K, 68K, 270K, 270K and 330K ohms respectively and for capacitors 110, 112, 114, and 116 to have values of .03 $\mu$f., .03 $\mu$f., .005 $\mu$f. and .005 $\mu$f. respectively. These typical values are of course applicable to the corresponding circuit components of RC filter 27.

Figure 6:
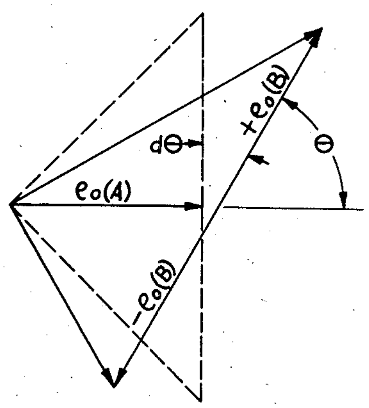
Fig. 6 illustrates the vectorial addition of the outputs of the power amplifiers with respect to phase angle comparison.

The phase angle control feature of the present invention provides precision regulation, closed loop stability and minimum phase angle modulation. As set forth above in describing amplitude control, one of the most important aspects is error detection. In Fig. 6, there is depicted the vectorial addition of one leg of the phase A signal to the plus and minus legs of the phase B signal. The magnitudes of the resultant vectors are compared, and if any deviation, $d\theta$ exists from 90°, a resultant error signal is present. The polarity of the error signal is a function of the polarity of angle error. The vectors designated $+e_0$(B) and $-e_0$(B) are the plus and minus legs from the output of power amplifier 24. The vector designated as $e_0$(A) is the plus leg from the output of power amplifier 14.

Referring back to Fig. 1, it is seen that in the phase A channel, one leg of the output of power amplifier 14 is applied to linear rectifier 34 through a resistor 122 and to linear rectifier 32 through a resistor 124. One leg of the output of power amplifier 24 is applied to linear rectifier 32 through a resistor 126 and the other leg is applied to linear rectifier 34 through a resistor 128. The voltage at the midpoint 130 of a voltage divider comprising equal value resistors 132 and 134 connected between the respective outputs of linear rectifiers 32 and 34, is applied through lowpass RC filter 36 to a direct current amplifier 38, the output of differential amplifier 38 being applied as a second input to phase shift control stage 20.

In order to compare magnitudes, the vector resultants of the additions are rectified. The error voltage is given by the expression $$\epsilon=\frac{1.414e_0}{2.22}\left(\sin\frac{\pi}{4}-\frac{\theta}{2}\right)$$

with the presupposition of equal magnitudes for the phase A output from amplifier 14 and both legs from the phase B output of amplifier 24. If the angle difference is small, the error voltage will be approximately $$\epsilon=\frac{.707e_0}{2.22}\left(\frac{\pi}{2}-\theta\right)$$

Figure 7:
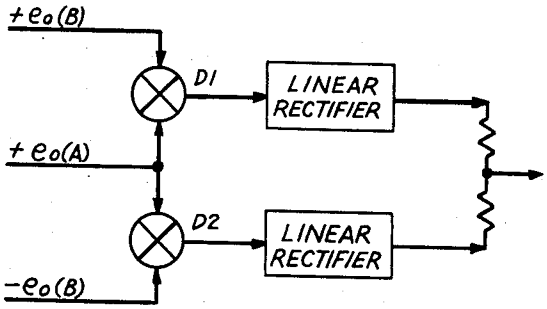
Fig. 7 depicts the operation of the phase angle detection arrangement.

Fig. 7 shows the arrangement phase angle error detection. The difference $D_1$ between the plus leg of the phase B signal and the plus leg of the phase A signal is applied to a linear rectifier and the difference $D_2$ between the plus leg of the phase A signal and the minus leg of the phase B signal is applied to a second linear rectifier. The voltage present at the midpoint of the voltage divider connected between the respective outputs of the linear rectifiers is the voltage applied to the differential amplifier through a low pass RC filter.

Figure 8:
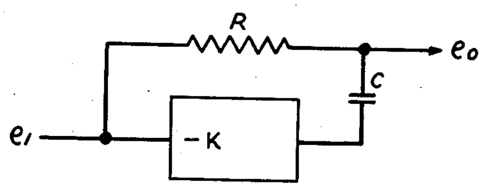
Fig. 8 illustrates variable gain control network.

Fig. 8 shows the phase shift control stage 20. It comprises the same or similar variable gain stage amplifier as shown in Fig. 4 for gain control stages 12 and 22 in conjunction with an external RC network comprising resistor R and capacitor C. It is seen that $$\frac{e_0}{e_1}=\frac{(1-KJ\omega RC)}{1+J\omega RC}$$

Phase angle output is then given by $$\tan\theta=\frac{-(1+K)\omega RC}{1-K\omega^2(RC)^2}$$

Considering the above as an example, if it were desired to place the operation of stage 20 in an optimum control position of K's of 0 to 4, design center K is 2. Thus $$\omega^2(RC)^2=\frac{1}{K}=\frac{1}{2}$$

or $$RC=\frac{1}{\omega\sqrt{2}}$$

For a given operating frequency $$RC=\frac{.159}{f\sqrt{2}}$$

Figure 9:
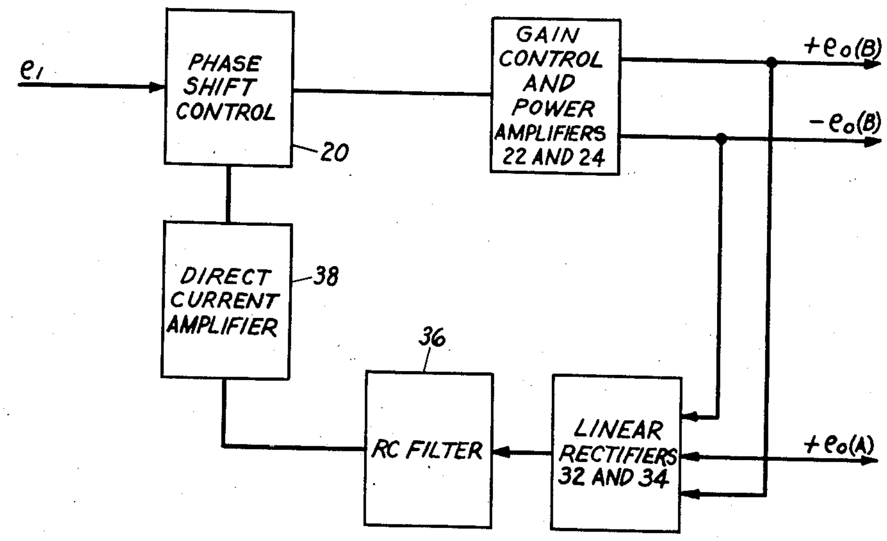
Fig. 9 shows the closed loop operation of the phase angle regulation.

Fig. 9 is the closed loop block diagram illustrating phase angle regulation. The signal $e_1$ from the master oscillator 10 is shifted in phase 90° in stage 20 and amplified by gain control amplifier 22 and push pull power amplifier 24 which provides substantially equal plus and minus legs $+e_0$ (B) and $-e_0$ (B). These are compared with the plus leg $+e_0$ (A) of the output of pushpull power amplifier 14, and the error voltage is applied through low pass filter 36 and direct current amplifier 38 as a second input to phase shift control stage 20.

Obviously many modifications and variations of the present invention are possible in the light of the above teachings. It is therefore to be understood that within the scope of the appended claims the invention may be practiced otherwise than as specifically described.

I claim:

1. A system for providing a plurality of voltages of substantially equal amplitude and in quadrature with one another comprising a signal source, a first channel comprising first signal amplifying means having output terminal means for providing one of said voltages, means for applying a signal from said source as one input to said first signal amplifying means, first linear rectifier means coupled to the output terminal means of said first signal amplifying means, a first differential amplifier, means for applying the output of said first linear rectifier means as a first input to said differential amplifier, a source of reference direct current voltage, means for applying said direct current voltage as a second input to said differential amplifier and means for applying the output of said differential amplifier as a second input to said first signal amplifying means, a second channel comprising means for shifting a signal phase 90°, means for applying said signal from said source as a first input to said phase shifting means, second signal amplifying means having output terminal means for providing another of said voltages, means for applying the output of said phase shifting means as a first input to said second signal amplifying means, second linear rectifier means coupled to the output terminal means of said second signal amplifying means, a second differential amplifier, means for applying the output of said second linear rectifier means as a first input to said second differential amplifier, means for applying said direct current voltage as a second input to said second differential amplifier and means for applying the output of said second differential amplifier as a second input to said second amplifying means, phase sensitive detection means coupled to the output terminal means of said first and second amplifying means for deriving a signal which is proportional to any phase difference from 90° between the output terminal means respectively of said first and second amplifying means and means for applying the output of said phase sensitive detection means as a second input to said phase shifting means.

2. A system as defined in claim 1 wherein said first and second signal amplifying means respectively comprise a voltage amplifier and a push-pull power amplifier coupled to the output of said voltage amplifier, said push-pull power amplifiers having said terminal means.

3. A system as defined in claim 2 wherein said voltage amplifier comprises a pentode and wherein said first input is applied to its control grid and wherein said second input is applied to its suppressor grid.

4. A system as defined in claim 3 including means in the input circuit of said pentode for maintaining a given operating point on said control grid.

5. A system as defined in claim 1 wherein said linear rectifier means compromises a direct current amplifier having a parallel combination of a diode and a resistance connected thereacross.

6. A system as defined in claim 1 and further including lowpass filter means connected between the outputs respectively of said first and second linear rectifier means and the inputs of said first and second differential amplifiers.

7. A system as defined in claim 1 wherein said phase shifting means comprises third signal amplifying means having an external time constant circuit associated therewith.

8. A system as defined in claim 1 wherein said phase sensitive detection means comprises third linear rectifier means coupled to the plus leg of the output terminal means of said first signal amplifying means, fourth linear rectifier means coupled to the minus leg of the output terminal means of said second signal amplifying means, means for applying the plus leg of the output terminal means of said first signal amplifying means in additive arrangement with said plus leg of said second signal amplifying means as an input to said third linear rectifier means and means for applying the plus leg of the output of said first signal amplifying means and the minus leg of said second signal amplifying means as an input to said fourth linear rectifier means, and a voltage divider network connected across the outputs of said third and fourth linear rectifiers, whereby the voltage at the midpoint of said voltage divider network is proportional to any phase difference other than 90° between the outputs of said first and second signal amplifying means.

9. A system as defined in claim 8 and further including a low pass filter connected to said midpoint, and a direct current amplifier interposed between said filter and said phase shifting means.

10. A system as defined in claim 9 wherein said third and fourth linear rectifier means respectively comprise a direct current amplifier having a parallel combination of a resistance and a diode connected thereacross.

References Cited in the file of this patent

UNITED STATES PATENTS 2,731,590 Smith ________________ Jan. 17, 1956

UNITED STATES PATENT OFFICE

Certificate of Correction

Patent No. 2,827,576 March 18, 1958

Robert J. Wohlers

It is hereby certified that error appears in the printed specification of the above numbered patent requiring correction and that the said Letters Patent should read as corrected below.

Column 1, line 30, for "frequently" read —frequency—; column 3, lines 17 and 18, left-hand portion of the formula, for "$=K_1K_0K_2$" read —$=K_1K_0R_2$—; line 45, for $$\frac{dY}{X} \quad \text{read} \quad \frac{dY}{Y}$$

Signed and sealed this 27th day of May 1958.

[SEAL]

Attest:

KARL H. AXLINE,
*Attesting Officer.*

ROBERT C. WATSON,
*Commissioner of Patents.*